Oct. 8, 1957            L. MACCHI            2,809,067
EXTRACTOR IMPLEMENT FOR CRAB GRASS
Filed Nov. 17, 1955
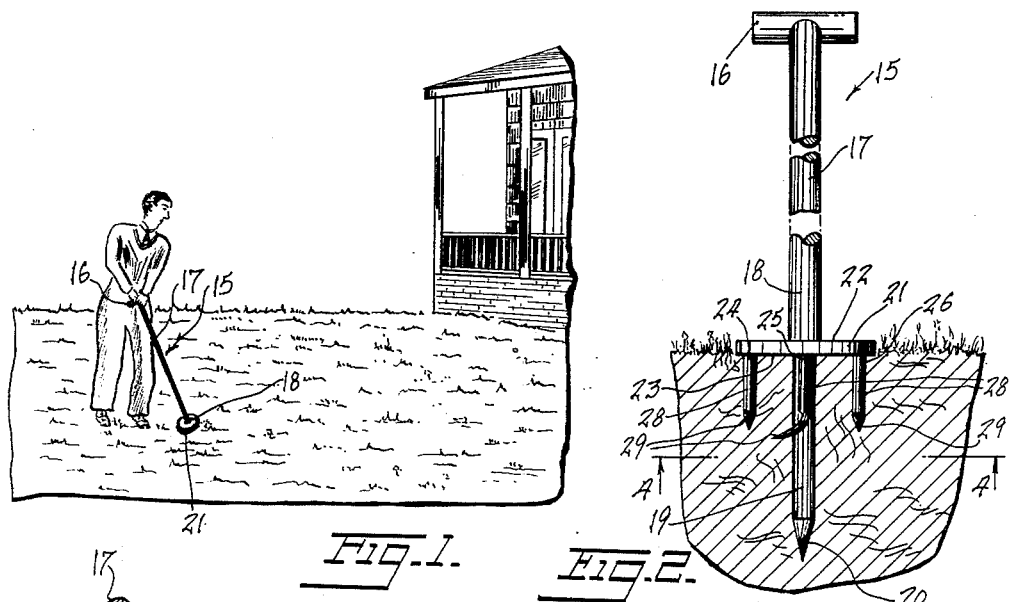
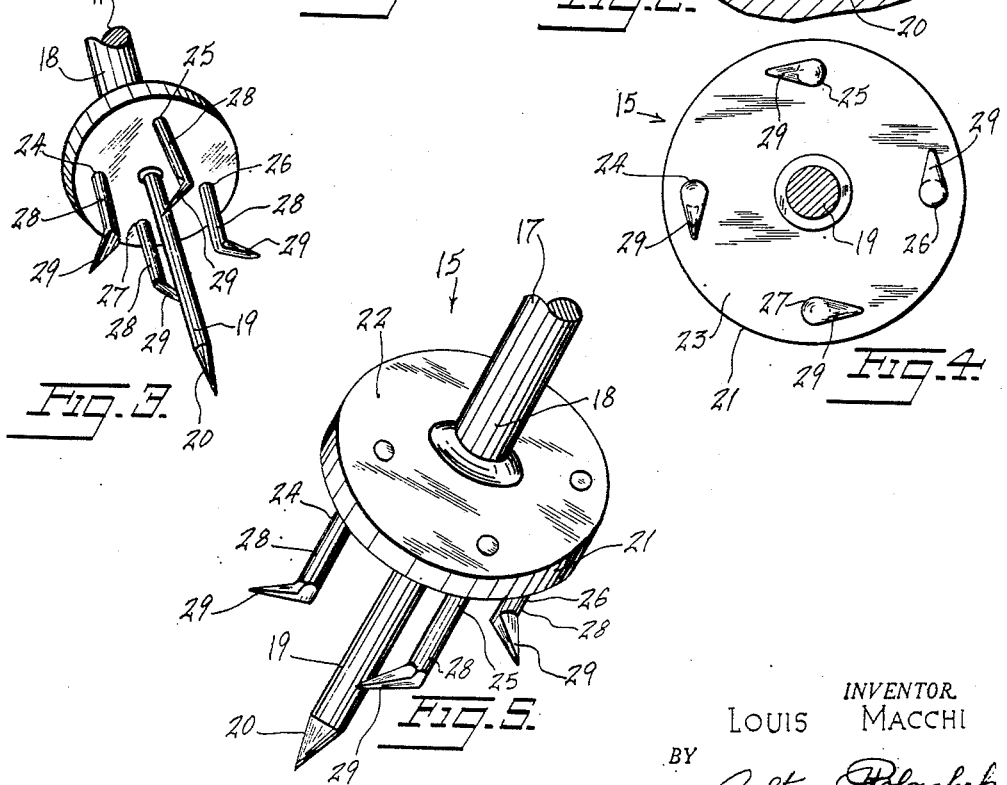
INVENTOR
LOUIS MACCHI
BY
ATTORNEY

United States Patent Office 2,809,067
Patented Oct. 8, 1957

2,809,067
EXTRACTOR IMPLEMENT FOR CRAB GRASS

Louis Macchi, Syosset, N. Y.

Application November 17, 1955, Serial No. 547,401

2 Claims. (Cl. 294—50.7)

This invention relates to new and useful improvements in weed and crab grass extracting devices.

More particularly, the present invention proposes the construction of an improved crab grass extractor which can easily and conveniently be used in soft or hard ground to extract crab grass, weeds and the like.

As a further object, the present invention proposes forming the extractor with a rod and a foot plate with a straight piercing point extending below the foot plate which can be driven into the ground merely by stepping on top of the foot plate.

Another object of the invention proposes constructing the extractor with a plurality of spaced digging points extending from the foot plate and disposed around the straight piercing point with bent angular blade tip portion to cut out crab grass or weeds when the rod is turned by a handle end portion.

Still another object of the present invention proposes forming the digging points with downwardly inclined leading edge blade portions all pointed in the same angular direction for ease in cutting through roots and dirt surrounding crab grass or weeds.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective pictorial view of an extractor for crab grass constructed and arranged in accordance with the present invention.

Fig. 2 is a side view of the extractor with parts broken away.

Fig. 3 is a perspective bottom view of the extractor with the handle and part of the shank broken away.

Fig. 4 is an enlarged sectional view taken on line 4—4 of Fig. 2.

Fig. 5 is an enlarged perspective top view of the extractor with the handle and part of the shank broken away.

Referring more particularly to the drawings, the extractor for crab grass, weeds and the like in accordance with the present invention has a stiff or stiffly flexible straight rod 15 which preferably is made of metal.

Rod 15 has a handle or handle end 16, a shank or shank portion 17 and a tool end 18. On the tool end 18 of rod 15 is a piercing straight portion or stem 19 having a pointed tip 20 and axially aligned with the straight rod 15.

A disc-shaped foot plate 21 is secured to or formed integral with the rod 15 at the tool end 18 and above the straight piercing portion 19. The foot plate is centrally secured to the rod 15 so as to extend around the rod.

Foot plate 21 has a top surface 22 for foot pressure to drive or sink the piercing straight portion 19 into the ground and a bottom surface 23 with a plurality of spaced digging stems 24, 25, 26 and 27 spaced around the piercing straight stem 19. The foot plate not only acts as a foot press but also serves as a stop.

Digging stems 24, 25, 26 and 27 have straight stems 28 with axes parallel to the axis of the straight piercing stem 19 and angled tip cutting portions or blades 29 all of which are disposed in the same angular direction in a circle around the piercing straight stem 19.

The angled tip cutting portions 29 are in the form of bent blades so as to cut out a patch or circle of crab grass when the rod is turned and the piercing straight stem 19 is sunk into the ground in the center of the patch or circle to be cut out. The angled bent blade tip portions 29 of the digging stems 24, 25, 26 and 27 are downwardly inclined so as to reach the roots of the crab grass and easily cut them on clockwise rotation of the rod 15 and thereafter release the cut crab grass after lifting the latter, when the rod is turned in a counterclockwise direction and shaken by its handle portion 16.

While the handle or handle portion 16 of the rod 15 is shown to be of T-shape, it is obvious that any bent or angular handle may be provided if desired.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. An extractor for crab grass comprising a rod having a handle, a shank portion and a tool end with a straight piercing point, a disc-shaped foot plate on the rod extending around the rod at the tool end and spaced from said piercing point, said foot plate having a bottom surface with a plurality of digging stems spaced around the straight piercing point, said digging stems having straight shanks axially parallel to the straight piercing point of the rod and having angled bent blade tip cutting portions, said angled bent blade tip cutting portions having sharpened blade leading edges disposed in the same angular direction around the straight piercing point and disposed in a plane between the tip of the straight piercing point and the bottom surface of the foot plate, said angled bent blade tip cutting portions being downwardly inclined.

2. An extractor for crab grass comprising a rod having a handle end portion and a shank end portion, a disc-shaped foot plate centrally secured to the shank end portion of the rod at right angles to the rod, said foot plate having a bottom surface with a straight piercing stem depending from the center of the foot plate and a plurality of digging stems spaced around the straight piercing stem, said digging stems having straight shanks shorter than the straight piercing stem and having angled blade tip cutting portions, said angled blade tip cutting portions being disposed in a circle around the straight piercing stem, and being downwardly inclined, said foot plate being a disc and said digging stems being disposed in a circle around the straight piercing stem and spaced inside the peripheral edge of the foot plate.

References Cited in the file of this patent
UNITED STATES PATENTS

| Number | Name | Date |
|---|---|---|
| 473,316 | Hunter | Apr. 19, 1892 |
| 1,501,965 | Moors | July 22, 1924 |
| 1,647,832 | Kovar | Nov. 1, 1927 |
| 2,492,035 | Doble | Dec. 20, 1949 |
| 2,539,849 | Lum | Jan. 30, 1951 |